US012662807B2

(12) United States Patent
Kropotin et al.

(10) Patent No.: US 12,662,807 B2
(45) Date of Patent: Jun. 23, 2026

(54) CONSTRUCTION SYSTEM FOR ERECTING HIGH-RISE LOAD-BEARING FRAME STRUCTURE

(71) Applicant: PRAK Energy Inc., McLean, VA (US)

(72) Inventors: Petr Kropotin, Almaty (KZ); Ruslan Sokolov, Almaty (KZ)

(73) Assignee: PRAK ENERGY INC., McLean, VA (US)

(*) Notice: Subject to any disclaimer, the term of this patent is extended or adjusted under 35 U.S.C. 154(b) by 282 days.

(21) Appl. No.: 18/396,095

(22) Filed: Dec. 26, 2023

(65) Prior Publication Data

US 2025/0207386 A1 Jun. 26, 2025

(51) Int. Cl.

*E04B 1/35* (2006.01)
*B66F 3/08* (2006.01)
*B66F 3/46* (2006.01)

(52) U.S. Cl.

CPC .............. *E04B 1/3522* (2013.01); *B66F 3/08* (2013.01); *B66F 3/46* (2013.01); *E04B 2001/3588* (2013.01)

(58) Field of Classification Search

CPC .. E04B 1/3522; E04B 2001/3588; B66F 3/08; B66F 3/46; E04H 12/344; E04G 13/02
See application file for complete search history.

(56) References Cited

U.S. PATENT DOCUMENTS 3,201,088 A * 8/1965 Long ..................... E04G 21/163 254/105
3,363,393 A * 1/1968 Von Heidenstam .. E04B 1/3511 52/125.1
3,570,813 A * 3/1971 Gretchenliev ...... E02B 17/0827 254/106
3,631,648 A * 1/1972 Filipek .................. E04B 1/3511 52/745.03
3,632,088 A * 1/1972 Filipek .................. E04G 21/161 254/105
3,692,446 A * 9/1972 Vanderklaauw ...... E04B 1/3511 425/63
3,726,053 A * 4/1973 Filipek .................. E04G 21/161 52/750
3,764,110 A * 10/1973 Csapo ....................... B66F 1/08 254/105
3,831,902 A * 8/1974 Vanderklaauw ...... E04B 1/3505 254/105

(Continued)

*Primary Examiner* — Gisele D Ford
(74) *Attorney, Agent, or Firm* — MUNCY, GEISSLER, OLDS & LOWE, P.C.

(57) ABSTRACT

A construction system for erecting a high-rise load-bearing frame structure. The system provides a plurality of columns that are connected by at least one beam. The system further contains a plurality of lifting assemblies with at least one post. Each lifting assembly is configured to vertically displace at least one column of the plurality of columns. The system can also have a truss that binds the plurality of lifting assemblies by connecting at least one post of the adjacent lifting assemblies. The plurality of lifting assemblies vertically displaces the columns of a first tier of columns to allow placement of additional tier consisting of a plurality of columns under the displaced columns of the first tier.

18 Claims, 11 Drawing Sheets

(56) References Cited

U.S. PATENT DOCUMENTS

| | | | | | |
|---|---|---|---|---|---|
| 4,832,315 | A * | 5/1989 | Vanderklaauw | E04B 1/3511 | 52/745.13 |
| 10,280,609 | B2 * | 5/2019 | Dhillon | E04H 12/341 | |
| 10,829,928 | B2 * | 11/2020 | Houston | E04B 1/3511 | |
| 10,907,376 | B1 * | 2/2021 | Bonilla | E04H 12/342 | |
| 11,772,258 | B2 * | 10/2023 | Lee | B25J 5/04 | 74/490.09 |
| 2004/0226258 | A1 * | 11/2004 | Zingerman | E04H 12/344 | 52/749.11 |
| 2008/0229684 | A1 * | 9/2008 | Joung | E04H 9/0235 | 52/167.4 |
| 2011/0078976 | A1 * | 4/2011 | Abeln | B66C 1/18 | 294/81.1 |
| 2014/0259985 | A1 * | 9/2014 | Petrello | E21B 15/00 | 52/745.18 |
| 2014/0260076 | A1 * | 9/2014 | Yustus | B66C 23/348 | 52/745.18 |
| 2014/0262518 | A1 * | 9/2014 | Reddy | E21B 15/00 | 175/57 |
| 2014/0262520 | A1 * | 9/2014 | Petrello | E21B 15/00 | 175/57 |
| 2015/0135632 | A1 * | 5/2015 | Dhillon | E04H 12/342 | 52/741.1 |
| 2016/0016767 | A1 * | 1/2016 | Jones | E02D 27/38 | 414/800 |
| 2017/0334694 | A1 * | 11/2017 | Chen | G05G 23/02 | |
| 2020/0002958 | A1 * | 1/2020 | Chen | E04G 21/3247 | |
| 2021/0207393 | A1 * | 7/2021 | Konduc | E04H 12/34 | |
| 2022/0333388 | A1 * | 10/2022 | Benvenuto | E04G 5/04 | |
| 2023/0374775 | A1 * | 11/2023 | Stewart | E04B 1/3511 | |
| 2024/0175277 | A1 * | 5/2024 | An | E04H 12/345 | |
| 2024/0301710 | A1 * | 9/2024 | Wensel | B66F 3/46 | |

* cited by examiner

CONSTRUCTION SYSTEM FOR ERECTING HIGH-RISE LOAD-BEARING FRAME STRUCTURE

TECHNICAL FIELD

The present disclosure generally relates to construction of load bearing structures. More specifically, the present invention relates to a construction system for erecting a high-rise load-bearing frame structure, such as an electric energy storage and delivery system.

BACKGROUND

Energy generation from renewable energy sources continues to be in demand. However, renewable energy sources, such as solar power and wind power, are inherently unpredictable and unreliable due to their reliance on environmental conditions.

Accordingly, in recent years the need for improved systems to capture electricity generated by renewable energy sources has been met by systems that rely on a weight elevation configuration that relies on gravitational force to store and deliver electrical energy. Generally, such systems store energy by moving a weight from a lower elevation to a higher elevation and generate (deliver) energy when the weight is lowered.

The more modern weight elevation configuration systems do not rely on a natural terrain to provide the elevation as such systems are less reliable and the necessary terrain may not be located near a power grid. Hence, modern systems often rely on man-made elevation points that can provide the necessary elevation and be built near the power grid or as otherwise needed.

There is, therefore, a need for an automated installation system that enables substantially automated and efficient construction of an electric energy storage and delivery system with a weight elevation configuration. Such systems may have a framework that exceeds 100 meters in height and can generate very large amount of energy. Moreover, such systems can be constructed in an expeditious and cost-effective manner to meet the ever-expanding demand for renewable energy.

SUMMARY

In one aspect, the present invention provides a construction system for erecting a high-rise load-bearing frame structure. The system has a plurality of columns that are connected by at least one beam, and a plurality of lifting assemblies. Each lifting assembly has at least one post. Each lifting assembly is configured to vertically displace at least one column of the plurality of columns. The system can also have a truss that binds the plurality of lifting assemblies by connecting at least one post of the adjacent lifting assemblies. The plurality of lifting assemblies vertically displaces the plurality of columns and thereby allowing for placement of additional plurality of columns under the displaced plurality of columns.

In another aspect, the present invention provides a tier-based system for assembly of a load-bearing frame. The system has at least one tier. The tier has a plurality of columns, and at least one column is configured to be connected with an adjacent column via at least one beam. A plurality of lifting assemblies is also provided. The plurality of lifting assemblies is configured to vertically displace a previous tier thereby allowing for placement of additional tiers under the previous tier.

In another aspect, the present invention provides a method for erecting a high-rise load-bearing frame structure. The method incorporates a step of providing a plurality of columns, each column is connected with an adjacent column via at least one beam. The method also provides for providing a plurality of lifting assemblies, each of the lifting assemblies having at least one post, and each lifting assembly is configured to vertically displace at least one column of the plurality of columns. In addition, the method incorporates providing a truss that binds the plurality of lifting assemblies by connecting the at least one post of the lifting assemblies, and displacing the plurality of columns via the plurality of lifting assemblies thereby allowing for placement of additional plurality of columns under the displaced plurality of columns.

BRIEF DESCRIPTION OF THE DRAWINGS

In order that the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, aspects of the invention will be described and explained with additional specificity and detail through the use of the accompanying drawings.

DETAILED DESCRIPTION

Figure 1C:
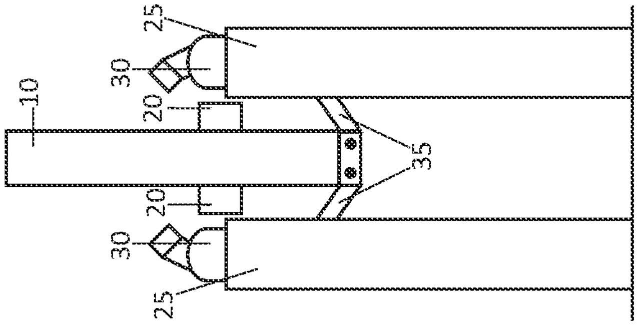
FIGS. 1A-1F depict diagrams of step-by-step assembly of a high-rise load-bearing frame structure of a construction system according to embodiments of the present invention.

Reference to "a specific embodiment" or a similar expression in the specification means that specific features, structures, or characteristics described in the specific embodiments are included in at least one specific embodiment of the present invention. Hence, the wording "in a specific embodiment" or a similar expression in this specification does not necessarily refer to the same specific embodiment.

Hereinafter, various embodiments of the present invention will be described in more detail with reference to the accompanying drawings. Nevertheless, it should be understood that the present invention could be modified by those skilled in the art in accordance with the following description to achieve the excellent results of the present invention. Therefore, the following description shall be considered as a pervasive and explanatory description related to the present invention for those skilled in the art, not intended to limit the claims of the present invention.

Reference to "an embodiment," "a certain embodiment" or a similar expression in the specification means that related features, structures, or characteristics described in the embodiment are included in at least one embodiment of the present invention. Hence, the wording "in an embodiment," "in a certain embodiment" or a similar expression in this specification does not necessarily refer to the same specific embodiment.

Embodiments of a construction system for erecting high-rise load-bearing frame structures, such as for an electric energy storage and delivery system with a weight elevation configuration are described herein. Modern electric power systems that rely on energy generation from renewable energy sources (RES) face challenges due to their inherent unpredictability and unreliability due to their reliance on environmental conditions. In recent years, the need for improved systems to capture electricity generated by renewable energy sources has been met by systems with a weight elevation configuration that relies on gravitational force to store and deliver electrical energy, namely, gravitational electrical energy (GES) systems. Generally, such systems store energy by moving a weight from a lower elevation to a higher elevation and securing the weight at a highest elevation position, and generate (deliver) energy when the weight is lowered.

At this moment, GES systems are being built, for example, in China due to the low cost of labor. Reducing the cost of labor in GES construction costs opens up the possibility of using such systems in countries with developed economies other than China, where human labor is quite expensive by comparison. At the same time, it is in these countries that wind farms and solar power plants are widespread, and efficient operation of wind farms and solar power plants is impossible without energy storage devices.

GES systems rely on a framework of load bearing structures to provide the necessary elevation to generate and store electrical energy. The weight is generally moved up and/or down at a distance of 100 meters or more. Generally, it is desirable to avoid horizontal support structures inside the frame, as they can be an obstacle to the vertical movement of weight inside. Thus, the GES frame is typically a high-rise load-bearing structure without horizontal structures like floors or ceilings. The construction of such load bearing structures is challenging. For example, it can be dangerous for workers erecting the constructions (as there is typically no intermediate support for the workers during the process). The construction also generally process requires highly qualified specialists in the field of high-rise installation, which significantly increases the cost of GES installation, especially in countries where the labor costs are high.

GES market is extremely competitive, and capital costs are one of the parameters that, when reduced, significantly expand the market for such systems. Hence, robotization of the construction of the GES frame can advantageously reduce the cost of the structure and the time of the construction.

Embodiments of the present invention provide for an installation system that enables substantially automated and efficient construction of high-rise load-bearing frame structures for an electric energy storage and delivery system with a weight elevation configuration that uses vertical column constructions for storing and moving weights. The frame can have a plurality of columns and beams. Beams can be used to connect the adjacent columns to each other in order to ensure the horizontal stability of the structure. The columns are stacked on top of each other, thereby increasing the height of the frame. Essentially, the frame is a multiple of horizontal tiers, and each tier has an array of columns connected by beams. That is, the frame consists of many tiers mounted on top of each other vertically.

An embodiment of the present invention provides for assembling a high-rise load-bearing frame without horizontal floor or ceiling, and uses a plurality of lifting assemblies (e.g., jacks) to raise the frame above ground level to a height that is sufficient for ground installation of the next tier of the frame.

Moreover, according to embodiments of this invention, columns and beams can be delivered as a set of prefabricates, or separately to the construction site for assembling the frame. The assembly of the first tier of the frame takes place on a pre-built foundation. The tier is assembled either manually, or using autonomous guided robots, which position and attach columns and connection beams. In some aspects, the autonomous guided robots are specifically designed for construction of the high-rise load-bearing frame. Alternatively, robotic solutions available on the market can be used, which are described in more detail in this disclosure. The robotic solution becomes possible because the assembly of the columns and beams is a replicable set of operations, namely, delivery of the columns and beams to the installation site, positioning of the columns, vertical fixation of the columns in the design position, and fastening of the adjacent columns by beams. Then, the lifting assemblies are mounted to the columns of the first tier. The lifting assemblies are not necessarily installed on every column and can be installed on the columns with a predetermined and particular uniformity depending on the requirements of a specific assembly. In this disclosure, an example, where the lifting assemblies are mounted to each column of the tier is discussed below.

Figure 1B:
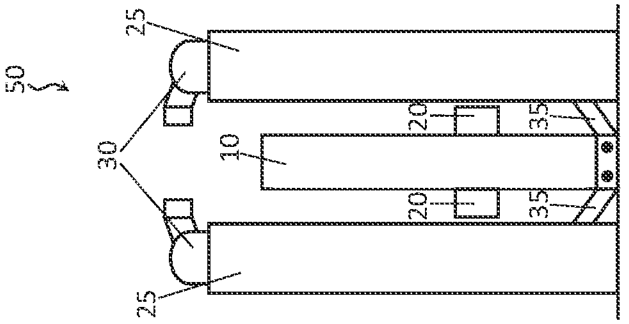
Figure 1A:
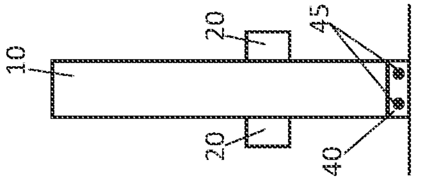

FIGS. 1A-1F illustrate a step-by-step assembly of a high-rise load-bearing frame structure 150 by a construction system 100 in accordance with embodiments of this invention. The system 100 has a plurality of columns 10 with stops 20 (projections). As shown in FIG. 1A, at the initial stage of the assembly, each column 10 is installed on a support platform 40.

Figure 2:
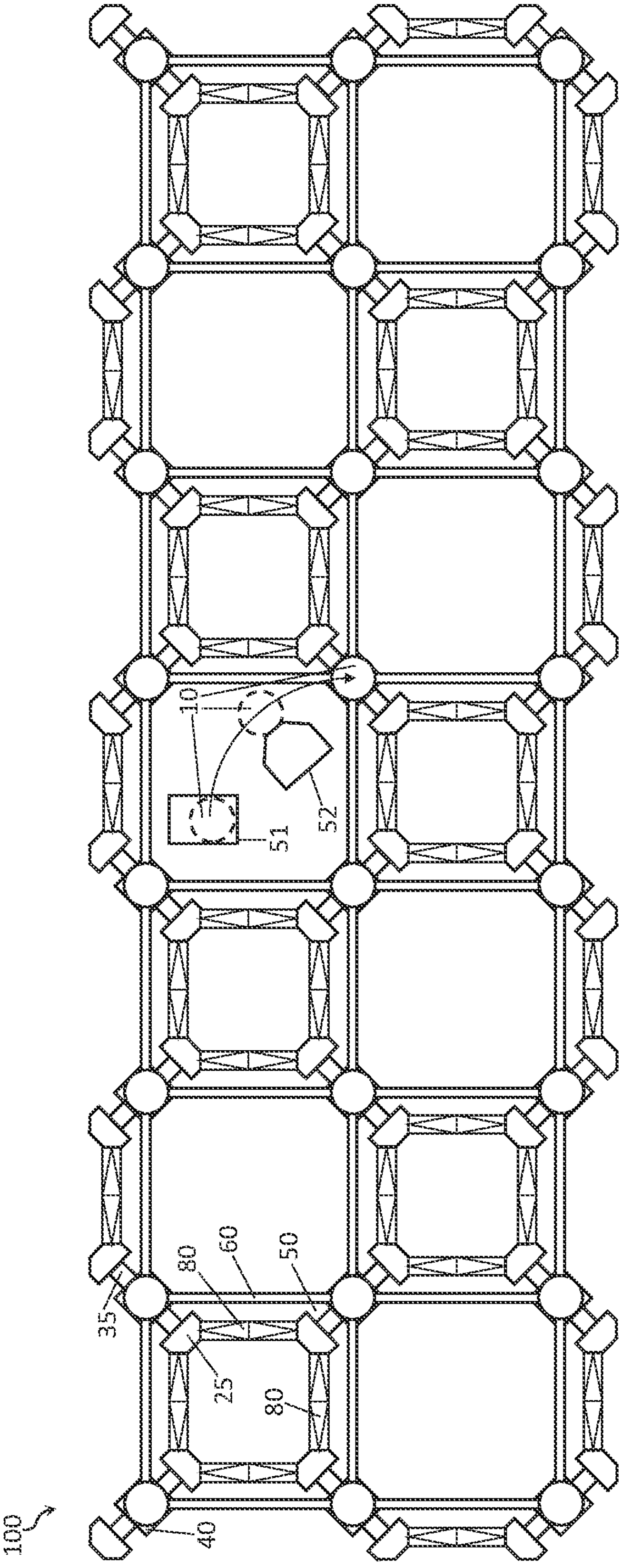
FIG. 2 depicts a diagram of a fastening embodiment of trusses according to embodiments of the present invention.

The columns 10 can be interconnected by at least one beam 60 (as shown in FIG. 2). For example, each column 10 is connected with an adjacent column 10 via at least one beam 60.

As illustrated in FIG. 1B, after assembling the first tier of the frame structure 150, which contains multiple columns 10 and beams 60, a lifting assembly 50 is mounted around each column 10. The lifting assembly has at least one post 25 connected to the support platform 40, and preferably two posts 25 as shown in FIGS. 1B-1F. Each post 25 can be equipped with at least one lock 30 and at least one holder 35. The holder 35 can be attached to the support platform 40 using pins 45.

Figure 3:
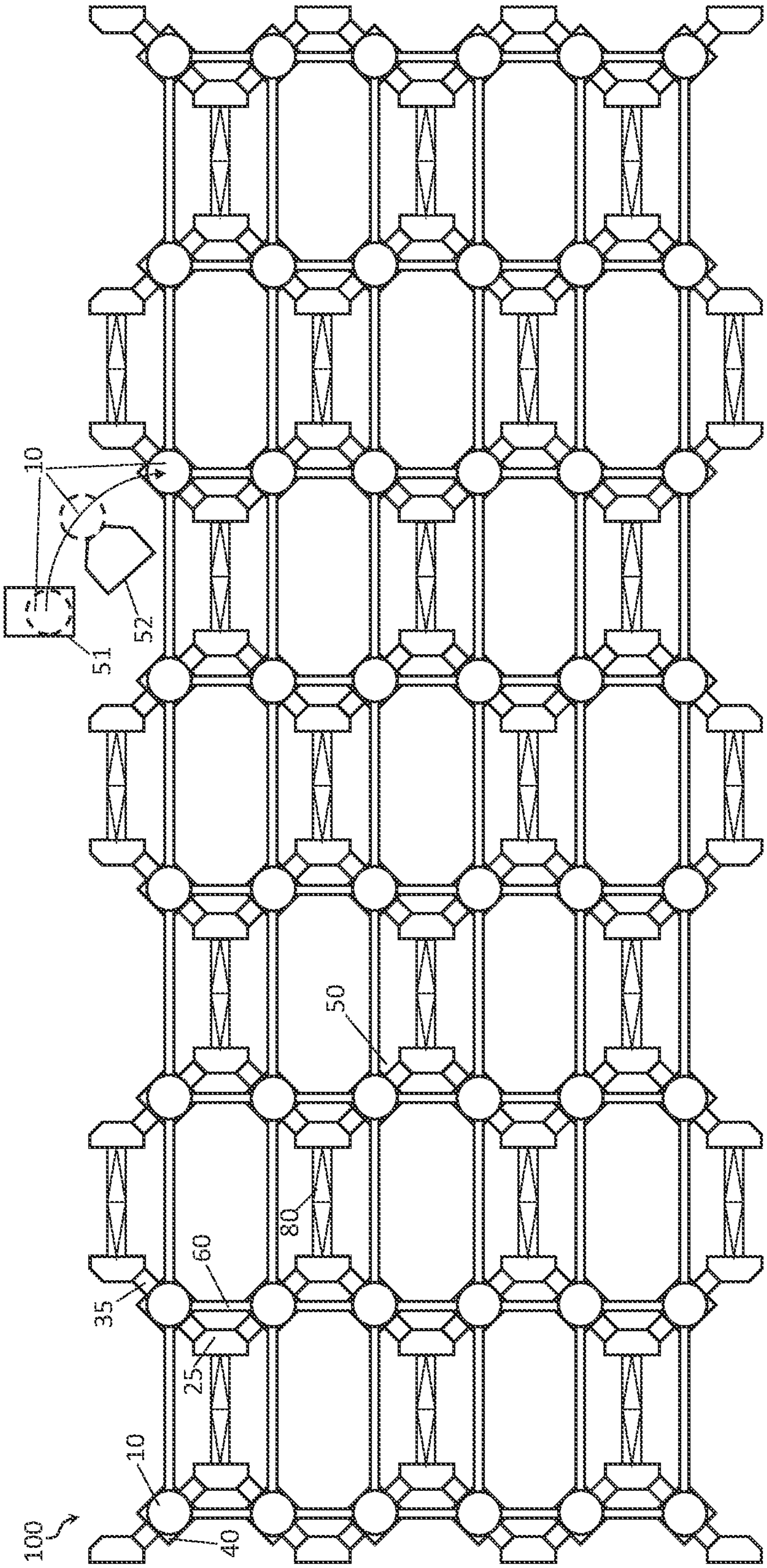
FIG. 3 depicts a diagram of another embodiment of trusses according to embodiments of the present invention.

Further, to ensure the vertical stability and rigidity of the lifting assemblies 50 during the assembly of the load-bearing frame structure 150, the adjacent lifting assemblies 50 can be fastened by trusses 80. FIGS. 2 and 3 illustrate the fastening configurations of the trusses 80. For example, two trusses 80 (shown in FIG. 2) and one truss 80 (shown in FIG. 3) per lifting assembly 50.

According to embodiment of the present invention, the posts 25 of the lifting assembly 50 contain an elevation mechanism 75 that displaces the support platform 40 vertically along the posts 25. Once the holders 35 attach using pins 45 to the support platform 40, the support platform 40 moves vertically along the posts 25 together with the column 10. In other words, using the support platform 40, the elevation mechanism 75 is configured to move the column 10 vertically upward by a predetermined distance to a predetermined height, for example approximately by a length/height of the column 10. During the lifting process, locks 30 open, either spontaneously from pressure applied by the stops 20 as the stops 20 move upward, or using a low-power drive (not shown) so that the stops 20 pass above the locks 30 (as illustrated in FIG. 1C).

Figure 1F:
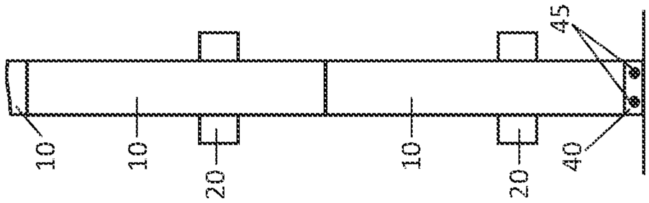
Figure 1E:
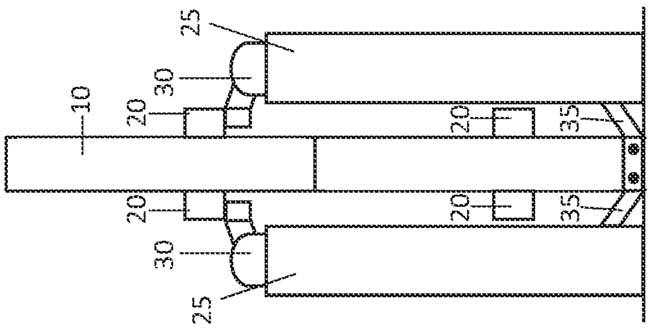
Figure 1D:
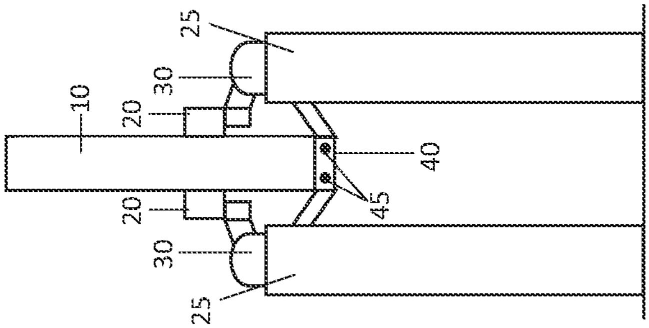

As shown in FIG. 1D, after the stops 20 pass the locks 30, the locks 30 close, and the stops 20 are lowered onto the locks 30. This allows the columns 10 to remain fixed at the predetermined height along with the entire initial (i.e., first) tier of the frame 150. Then, the support platform 40, driven by the holders 35 of the lifting assembly 50, is lowered to its initial position.

According to embodiments of the present invention, the next step of the assembly is installing a new column 10 onto the support platform 40, which, as previously described, can be secured to the adjacent columns 10 by the beams 60, forming a subsequent (i.e., second) tier. The new columns 10 attach to the columns 10 of the first tier by using known techniques in the art, for example, riveting, welding, or a dry joint. The new (second) tier of columns 10 and beams 60 is raised together with the preceding (first) tier built above it in a similar way (as shown in FIGS. 1B-1E) until all desired tiers are assembled, that is, until the frame 150 is completed. After the completion of the assembly of the frame 150, the lifting assemblies 50 can be dismantled and removed, and the support platform 40 can remain at the base of the constructed frame 150, as shown in FIG. 1F.

According to embodiments, as illustrated in FIGS. 1A-3, the assembly of each successive tier of the load-bearing frame 150 is carried out on a foundation, the surface of which can be pre-leveled. According to one embodiment of the present invention, the installation of the columns 10 and the beams 60 can be carried out using industrial robotic solutions known in the art, such as by automated (i.e., autonomous) guided vehicles 51, which can deliver the columns 10 and the beams 60 to the installation site, and by mobile robot systems with a manipulator 52 (e.g., KUKA KMR QUANTEC and/or BAUMULLER AMR, etc.), which can position the columns 10 and the beams 60 and secure them to each other by riveting or welding.

Figure 4:
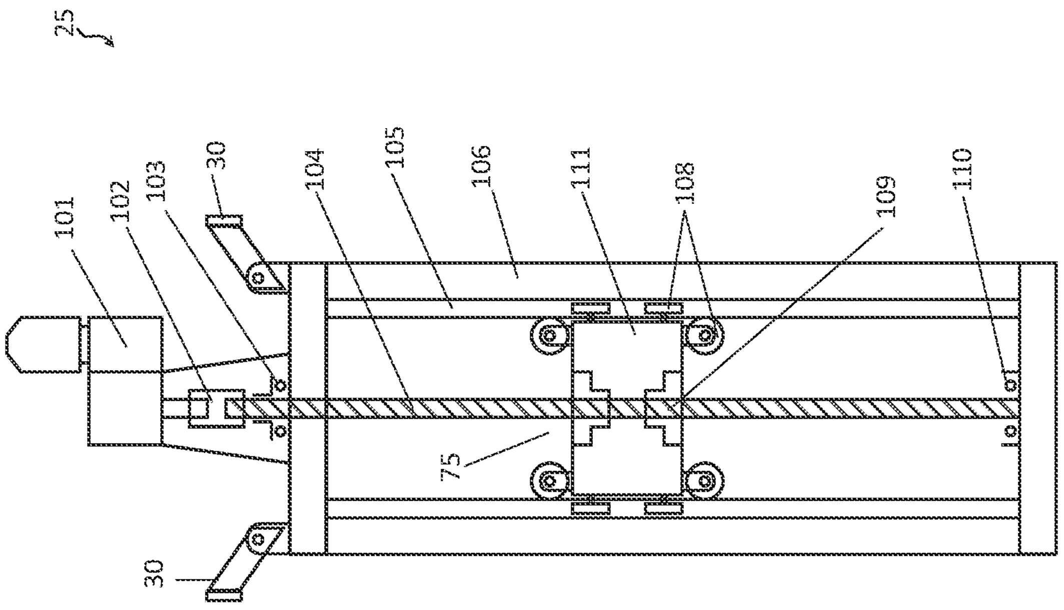
FIG. 4 depicts a diagram of a post of a lifting assembly according to embodiments of the present invention.

FIG. 4 illustrates a post 25 according to an embodiment of the present invention. The post 25 incorporates the elevation mechanism 75 that has an automated lead screw 104. The elevation mechanism 75 is configured inside a housing 106 of the posts 25. A drive 101, through a compensating clutch 102 and a thrust bearing 103, transmits torque to the lead screw 104. The lead screw 104 is fixed by a radial bearing 110. As the lead screw 104 rotates, a carriage 111 moves vertically along the screw 104 via two lead nuts 109 with the help of guide rollers 108, which move along guides 105. The holders 35 are linked to the carriage 111 which facilitates movement of the support platform 40 vertically along the lead screw 104.

Figure 5C:
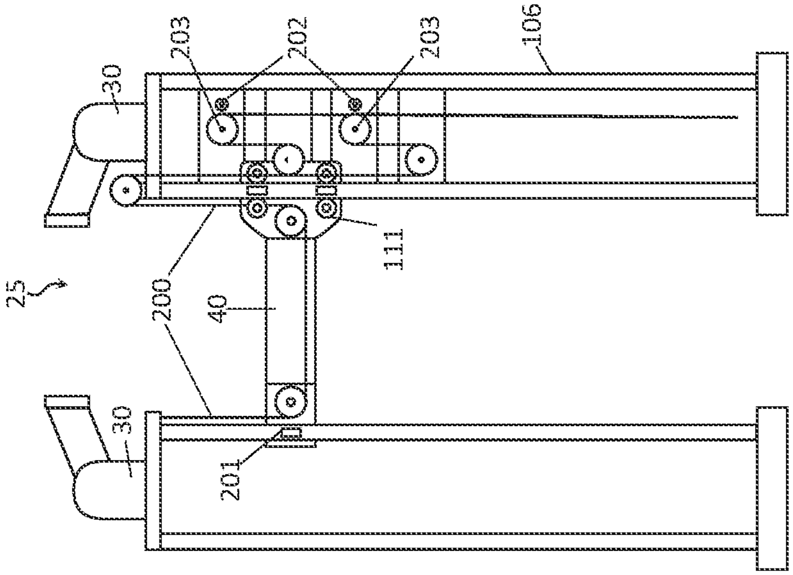
FIGS. 5A-5C depict diagrams of the post of the lifting assembly according to embodiments of the present invention.
Figure 5B:
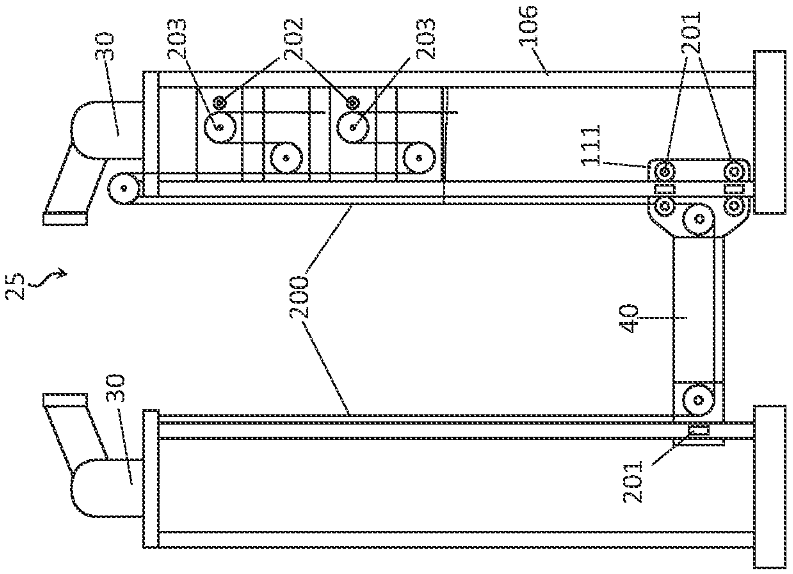
Figure 5A:
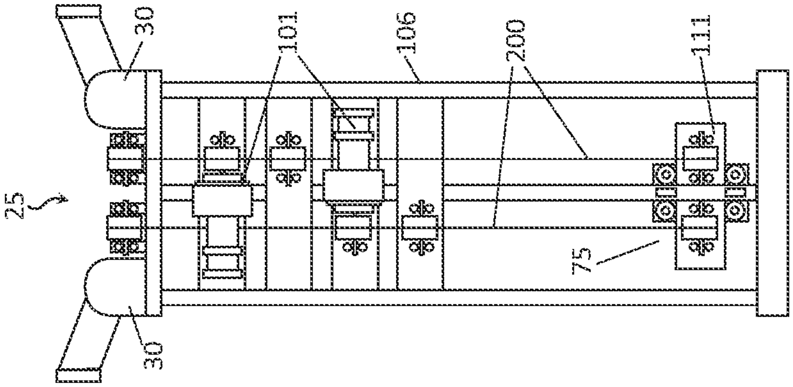

In another embodiment of the post 25 illustrated in FIGS. 5A-5C, the elevation mechanism 75 housed inside the housing 106 of the post 25 can be implemented in the form of an automated chain jack. The drive 101 uses drive rollers 203 in case a cable 200 is a rope, and sprockets 203 in case the cable 200 is a chain, to rewind the rope and/or chain 200, as applicable. The clamping of the chain and/or rope 200 to the sprockets and/or rollers 203, as applicable, is provided by pressure rollers 202. During the process of winding/unwinding the chain and/or rope 200, the platform 40, attached to the holder 35, moves vertically using guide rollers 201 between the position shown in FIG. 5B and the position shown in FIG. 5C.

Figure 6:
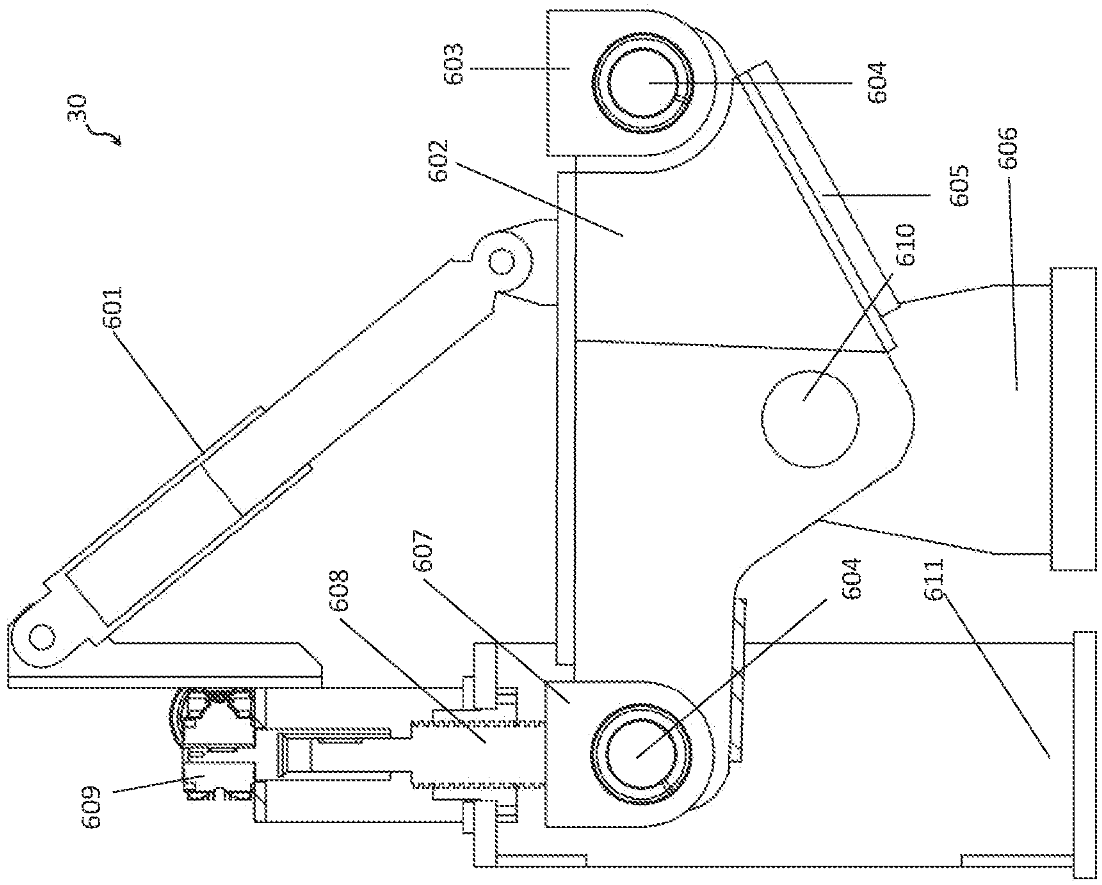
FIG. 6 depicts a diagram of locks according to embodiments of the present invention.

FIG. 6 illustrates the locks 30 in accordance with embodiments of the present invention. The exemplary lock 30 illustrated in FIG. 6 incorporates rests 611 and 606 that are fixedly attached to the housing 106 (shown in FIGS. 4 and 5), for example, by bolts (not shown). A stand 602 oscillates about an axis 610 attached to the rest 606. When the stop 20 of the column 10 exerts pressure on the plate 605, the stand 602 tilts counterclockwise about the axis 610, compressing the gas lift 601. That is, while the column 10 is raised, the stand 602 tilts counterclockwise about the axis 610, compressing the gas lift 601, and the stops 20 slide along the plate 605. When the stop 20 of the column 10 rises above the level of the stand 602, the stand 602, under its own weight, stretches the gas lift 601 and reverts to its original state. The stand 602 is equipped with heels 607 and 603. The stop 20 of the column 10 is lowered onto the heel 603. The heel 607 rests on the screw 608, which is adjusted by the drive 609. Adjusting the screw 608 using the drive 609 allows alignment of the axes 604 in the horizontal plane. Due to the permitted small degree of free rotation of the heels 607 and 603 around the axes 604, their surfaces fit tightly to the surfaces of the screw 608 and the stop 20.

Figure 7:
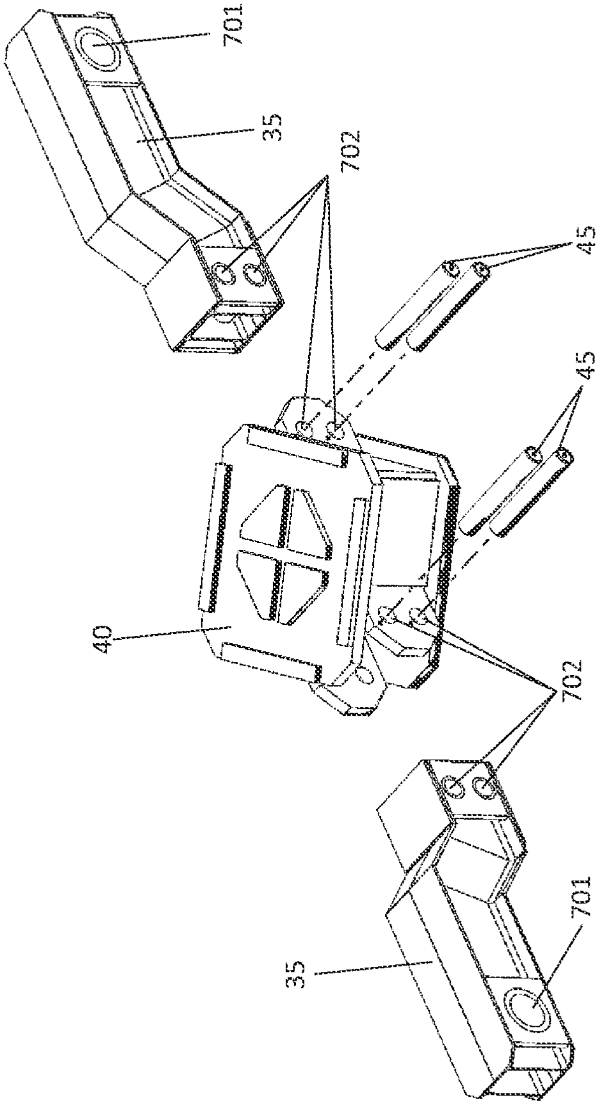
FIG. 7 depicts a diagram of a support platform according to embodiments of the present invention.

FIG. 7 illustrates exemplary embodiments of the support platform 40, the holders 35 and the pins 45. The holders 35 are inserted into the support platform 40 so that the holes 702, provided in the holders 35 and in the support platform 40, coincide. After the holes 702 are aligned, the pins 45 are inserted into the holes 702 to attach the holders 35 to the support platform 40. Disassembly of this assembly would occur in the reverse order. The holes 701 of the holders 35 serve to connect the holders 35 with other elements of the lifting mechanism of the post 25.

Figure 8:
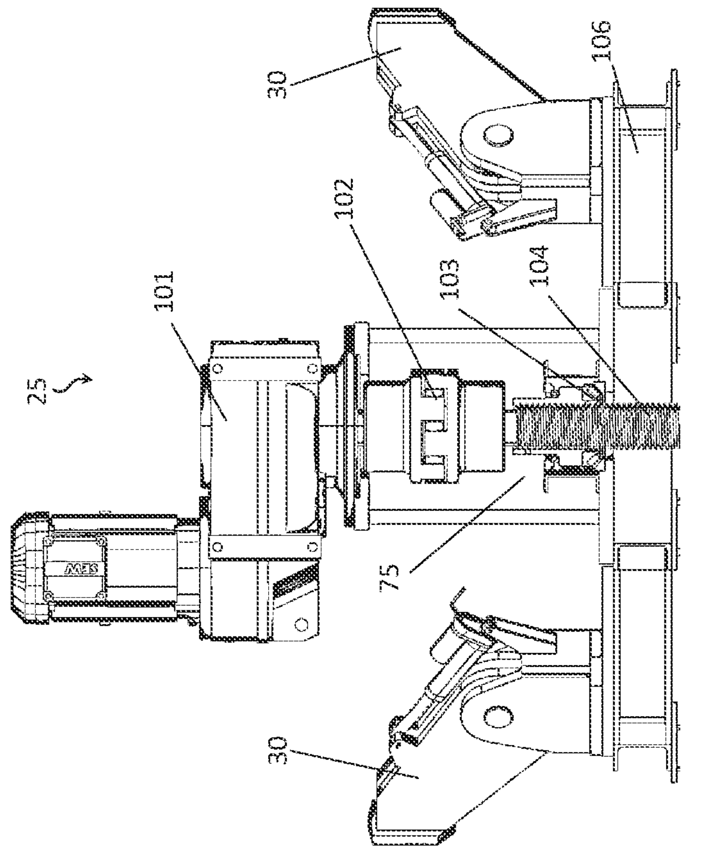
FIG. 8 depicts a diagram of an upper portion of the post in accordance with embodiments of the present invention.

FIG. 8 illustrates an embodiment of the upper portion of the post 25 that houses the elevation mechanism 75 that has the automated lead screw 104. The locks 30 are fixedly attached to the housing 106 (shown in FIGS. FIGS. 4 and 5). In the exemplary embodiment shown in FIG. 8, the drive 101 is configured, through the compensating clutch 102 and the thrust bearing 103, to transmit rotation to the lead screw 104.

Figure 9:
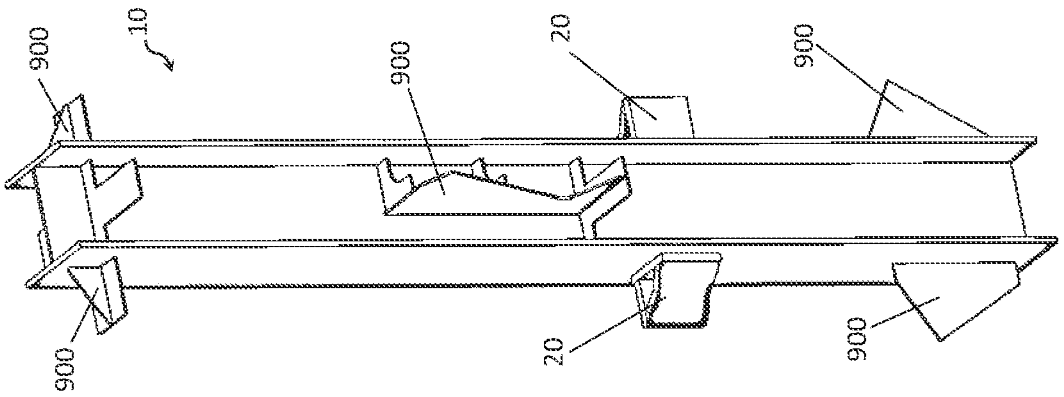
FIG. 9 depicts a column according to embodiments of the present invention.

FIG. 9 illustrates an embodiment of the column 10. As shown in FIG. 9, the stops 20 are attached to column 10, for example, using a welded joint. Petals 900 serve to attach the beams 60 to the column 10, for example, using a welded joint.

Figure 10:
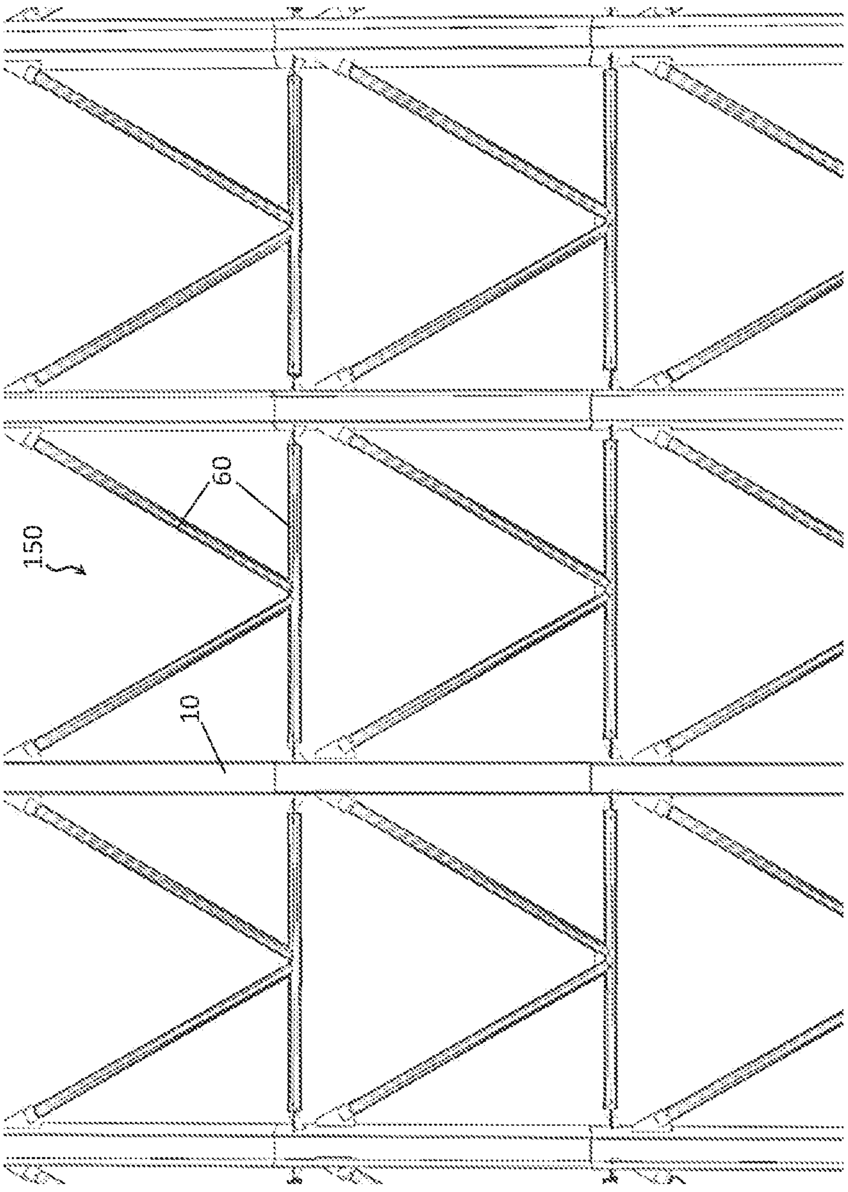
FIG. 10. depicts a diagram of the load-bearing frame structure according to embodiments of the present invention.

FIG. 10 illustrates an embodiment of the load-bearing frame structure 150. As shown in FIG. 10, the columns 10 can be attached to beams 60 using any technique known in the art, for example riveting, welding or bolted connections.

The foregoing detailed description of the embodiments is used to further clearly describe the features and spirit of the present invention. The foregoing description for each embodiment is not intended to limit the scope of the present invention. All kinds of modifications made to the foregoing embodiments and equivalent arrangements should fall within the protected scope of the present invention. Hence, the scope of the present invention should be explained most widely according to the claims described thereafter in connection with the detailed description, and should cover all the possibly equivalent variations and equivalent arrangements.

The terminology used herein is for the purpose of describing particular embodiments only and is not intended to be limiting of the present invention. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form described. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A construction system for erecting a high-rise load-bearing frame structure, the system comprising:
- a plurality of columns, each column of the plurality of columns comprising at least one stop;
- a plurality of lifting assemblies, each lifting assembly of the plurality of lifting assemblies comprises at least one post, an elevation mechanism, configured to raise and lower a respective column; and
- at least one lock associated with each lifting assembly and positioned to engage the stop of the respective column;
- wherein, during a lifting operation, the lock is moved from a closed position to an open position by engagement with the stop as the stop moves upward thereby permitting the stop to move upward past the lock, or engaging a low-power drive thereby the stop moves upward beyond the lock;
- wherein, after the stop moved above the lock, the lock automatically returns to the closed positions and the stop is lowered into a load-bearing engagement with the lock to support the column at a predetermined height; and
- wherein, after the stop is supported by the lock, the elevation mechanism is returned to an initial position independently of the supported column.

2. The system according to claim 1, further comprising at least one beam interconnecting adjacent columns and at least one automated guided vehicle configured to supply the columns and/or beams.

3. The system according to claim 1, further comprising at least one mobile robot configured to assemble the columns and at least one beam.

4. The system according to claim 1, wherein the at least one post comprises:
- a drive, wherein the elevation mechanism of the lifting assembly is configured to be coupled to and activated by the drive; and
- at least one lock coupled to the at least one post such that the at least one lock is permitted to move to the open position in response to the stop moving upward and to the closed position after the stop moves upward beyond the lock.

5. The system according to claim 1, wherein each lifting assembly further comprises:
- a support platform configured to support the column of the plurality of columns; and
- at least one holder configured to couple to and interconnect the support platform and at least one column of the plurality of columns.

6. The system according to claim 5, wherein the elevation mechanism comprises:
- a housing;
- an automated lead screw passing through at least a part of the housing of the at least one post;
- a compensating clutch; and
- a thrust bearing that transmits torque to the lead screw to rotate the lead screw and cause the support platform to move vertically along the lead screw.

7. The system according to claim 6, wherein the elevation mechanism further comprises a plurality of guide rollers.

8. The system according to claim 1, wherein each lifting assembly of the plurality of lifting assemblies comprises two posts.

9. The system according to claim 1, wherein the high-rise load-bearing frame structure comprises an electric energy storage and delivery system with a weight elevation configuration.

10. A method for erecting a high-rise load-bearing frame structure, the method comprising:
- providing a plurality of columns, each column of the plurality of columns comprising at least one stop;
- providing a plurality of lifting assemblies, each lifting assembly of the plurality of lifting assemblies comprising at least one post, an elevation mechanism, and an open position and a closed position, each lifting assembly being configured to vertically displace at least one column of the plurality of columns;
- vertically displacing the column using the elevation mechanism while engaging the lock from the closed position to the open position either by pressure applied by the stop as the stop moves upward, or by actuation of a low-power drive thereby permitting the stop to pass above the lock;
- after the stop passes above the lock, automatically returning the lock to the closed position;
- lowering the column such that the stop is seated on the lock to hold the column at a predetermined height; and
- returning the elevation mechanism to an initial position independently of the supported column.

11. The method according to claim 10, wherein the high-rise load-bearing frame structure comprises an electric energy storage and delivery system with a weight elevation configuration.

12. The method according to claim 10, further comprising interconnecting the columns by at least one beam and supplying the columns and beams by at least one automated guided vehicle.

13. The method according to claim 10, further comprising assembling the columns of the plurality of columns and at least one beam interconnecting the adjacent columns of the plurality of columns by at least one mobile robot.

14. The method according to claim 10, wherein each lifting assembly comprises two posts.

15. The method according to claim 10, wherein the at least one post comprises:

a drive;

an elevation mechanism configured to be coupled to and activated by the drive; and at least one lock coupled to the at least one post such that the at least one lock is permitted to move to the open position in response to the stop moving upward and to the closed position after the stop passes the lock.

16. The method according to claim 10, wherein each lifting assembly further comprises:

a support platform configured to support the column of the plurality of columns; and at least one holder configured to couple to and interconnect the support platform and at least one column of the plurality of columns.

17. The method according to claim 15, wherein the elevation mechanism comprises:

a housing;

an automated lead screw passing through at least a part of the housing of the at least one post;

a compensating clutch; and a thrust bearing transmitting torque to the lead screw to rotate the lead screw and cause the support platform to move vertically along the lead screw.

18. A tier-based system for assembly of a load-bearing frame, the system comprising:

a first tier including:

a plurality of columns, each column of the plurality of columns comprising at least one stop; and a plurality of lifting assemblies, configured to raise the first tier, each lifting assembly comprising at least one post, an elevation mechanism, and at least one lock movable between an open position and a closed position and positioned to selectively engage the stop;

wherein, during raising of the first tier, the lock is moved to the open position either in response to pressure applied by the stop as the stop moves upward, or by actuation of a low-power drive, thereby permitting the stop to move upward past the lock;

wherein, after the stop moved above the lock, the lock automatically returns to the closed position and the stop is seated on the lock to hold the first tier at a predetermined height, and the elevation mechanism is returned to an initial position independently of the first tier; and wherein the system permits assembly of at least one additional tier under the first tier while the first tier is held at the predetermined height.

* * * * *